United States Patent
Wedding

(10) Patent No.: US 7,137,749 B2
(45) Date of Patent: Nov. 21, 2006

(54) FASTER, PRACTICAL KEYBOARD

(76) Inventor: Rike Maria Wedding, 3652 Edinburgh St., Vancouver, British Columbia (CA) V5K 1B7

(*) Notice: Subject to any disclaimer, the term of this patent is extended or adjusted under 35 U.S.C. 154(b) by 0 days.

(21) Appl. No.: 10/537,774

(22) PCT Filed: Sep. 25, 2003

(86) PCT No.: PCT/CA03/01461

§ 371 (c)(1),
(2), (4) Date: Jun. 6, 2005

(87) PCT Pub. No.: WO2004/040429

PCT Pub. Date: May 13, 2004

(65) Prior Publication Data

US 2006/0088357 A1 Apr. 27, 2006

(30) Foreign Application Priority Data

Oct. 29, 2002 (CA) .................................... 2408521

(51) Int. Cl.
*B41J 5/10* (2006.01)

(52) U.S. Cl. ............... 400/486; 400/485; 400/489

(58) Field of Classification Search ............... 400/485, 400/486, 489; 341/22; 345/169
See application file for complete search history.

(56) References Cited

U.S. PATENT DOCUMENTS

| | | | | |
|---|---|---|---|---|
| 1,506,426 A * | 8/1924 | Hoke | ................... | 400/486 |
| 2,187,592 A * | 1/1940 | Paul | ................... | 400/486 |
| 4,613,247 A * | 9/1986 | McGunnigle | ................... | 400/486 |
| 5,212,638 A * | 5/1993 | Bernath | ................... | 715/535 |
| 5,336,002 A * | 8/1994 | Russo | ................... | 400/489 |
| 5,487,616 A * | 1/1996 | Ichbiah | ................... | 400/489 |
| 5,584,588 A * | 12/1996 | Harbaugh | ................... | 400/486 |
| 5,879,089 A * | 3/1999 | Armel | ................... | 400/489 |
| 6,932,525 B1 * | 8/2005 | Trotman | ................... | 400/489 |
| 6,965,372 B1 * | 11/2005 | Woods | ................... | 345/168 |

* cited by examiner

*Primary Examiner*—Daniel J. Colilla
*Assistant Examiner*—Dave A. Ghatt

(57) ABSTRACT

A keyboard for computers and data entry devices is disclosed, which increases typing speed, but at the same time eases the transition from the Standard Qwerty keyboard for experienced typists. Two letter sequences called digraphs are typed rapidly when struck by opposite hands. The proposed keyboard places frequently used digraphs on opposite hands and avoids the use of small fingers to increase typing speed. The home row is not emphasized and only three high frequency letters are moved relative to Qwerty positions, making the keyboard easy to learn. The constraints of maximal speed and minimal modification are satisfied concurrently. A second key is dedicated to the letter "E", the most frequently used letter in the English language, to further enhance typing speed and ease of transition from Qwerty. The result is a faster and highly practical electronic keyboard.

20 Claims, 4 Drawing Sheets

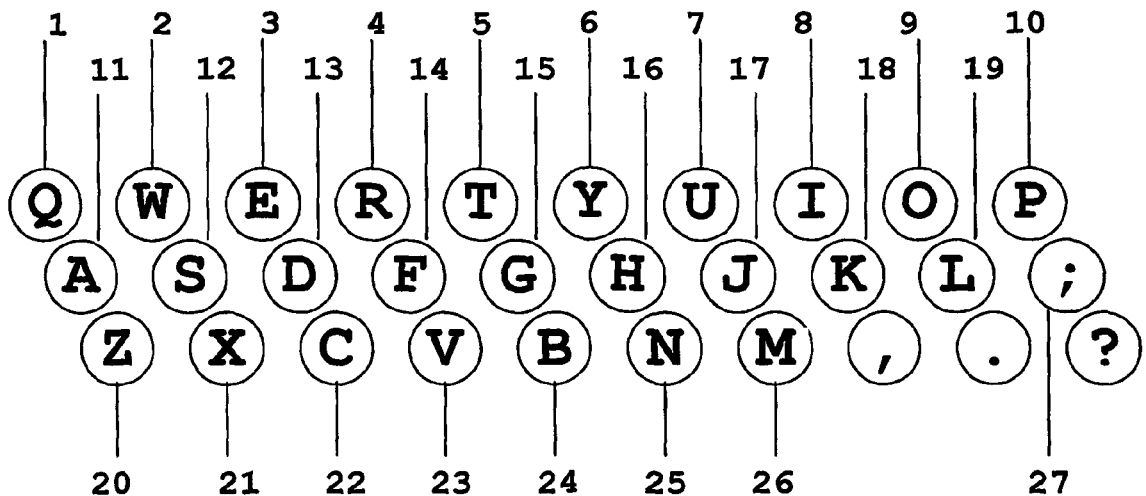
Fig. 1: Qwerty
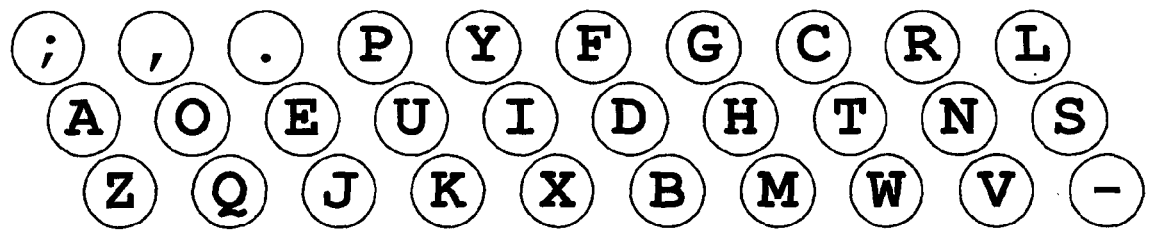
Fig. 2: Dvorak
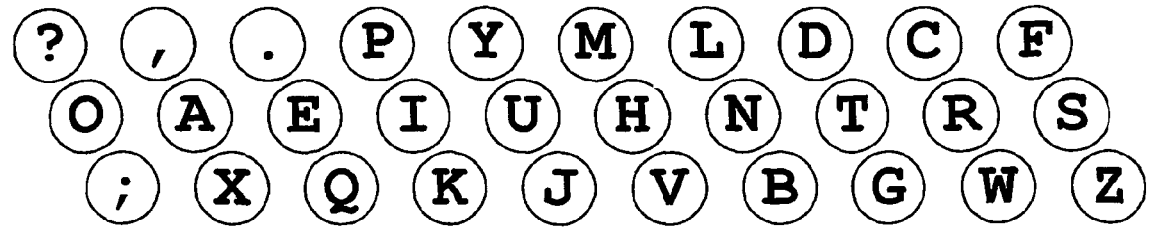
Fig. 3: "X"

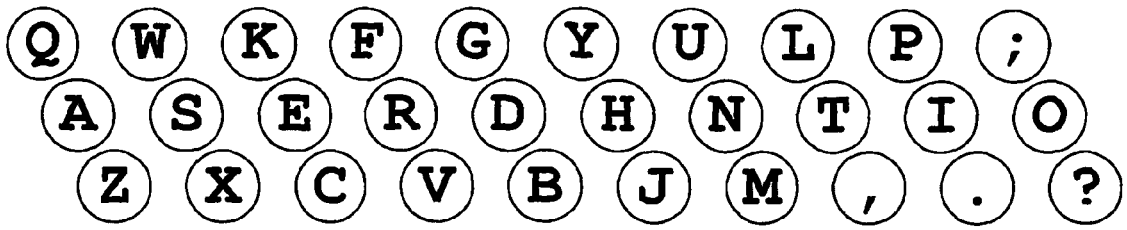
Fig. 4: ASER
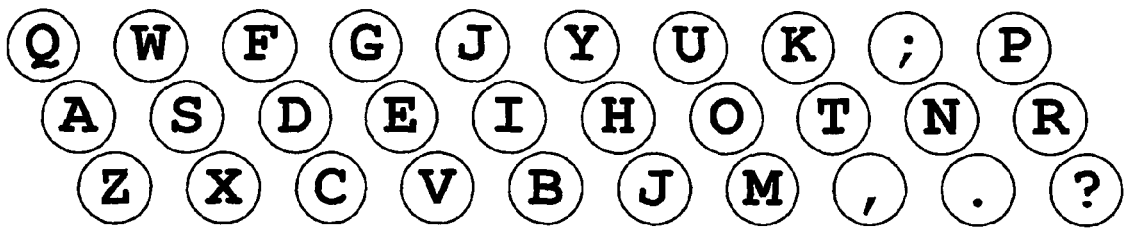
Fig. 5: Red Hot
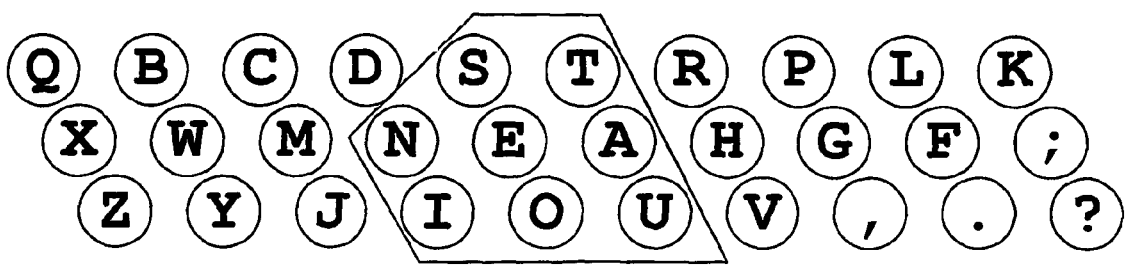
Fig. 6: Central

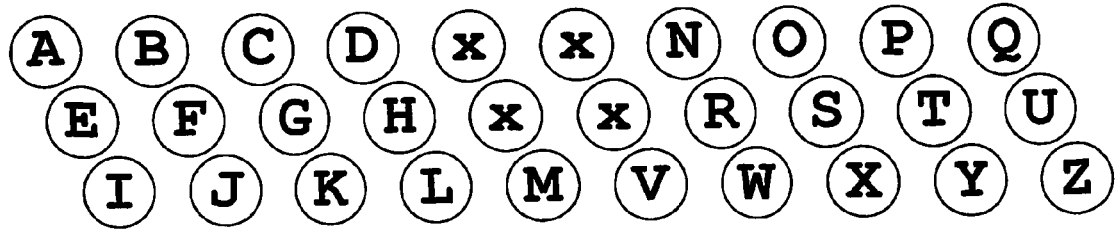
Fig. 7: Alphabetic
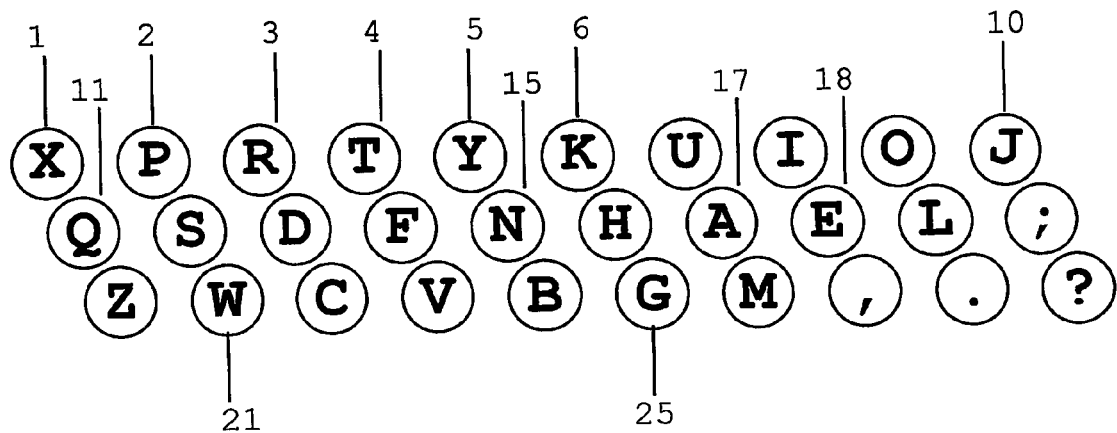
Fig. 8: XPeRT One
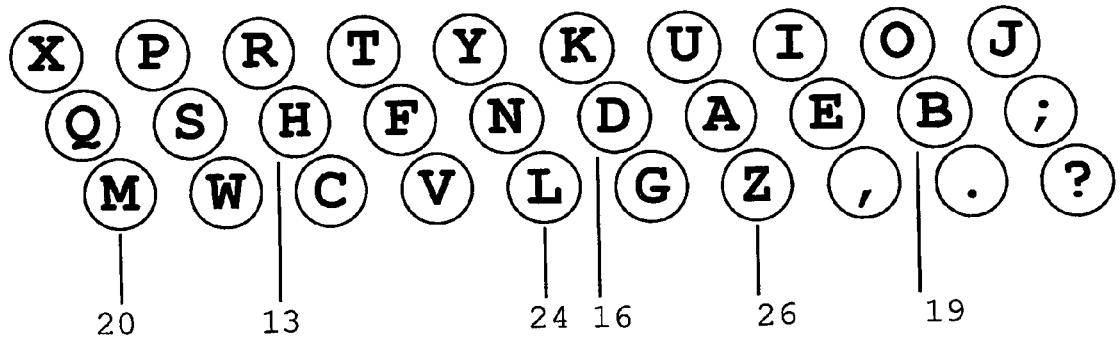
Fig. 9: XPeRT Express

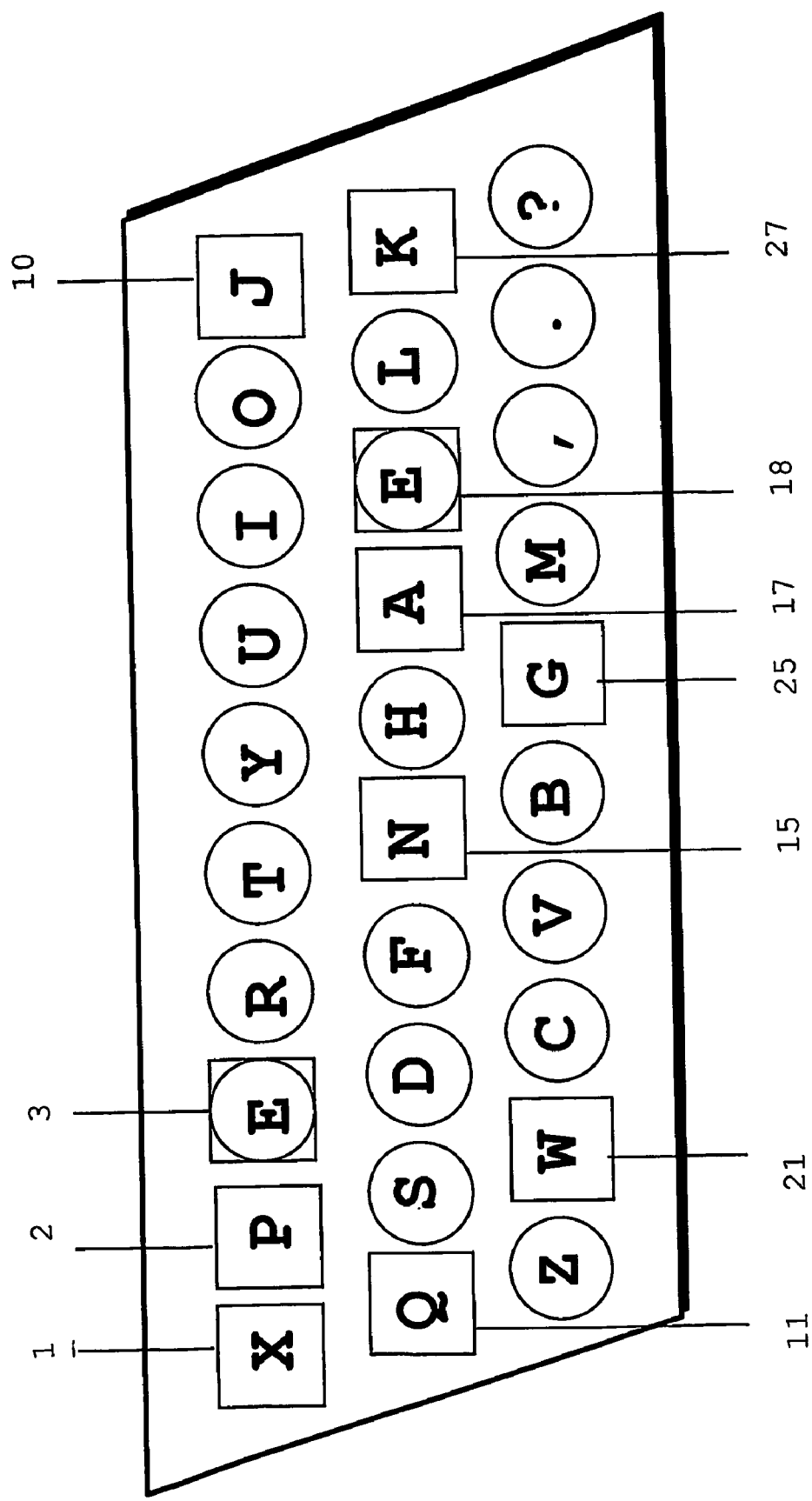
Fig. 10: XPeRT Two

FASTER, PRACTICAL KEYBOARD

TECHNICAL FIELD

A keyboard for computers or electronic data entry devices, adapted from the Standard Qwerty keyboard for ease of transition by experienced typists, with speed maximized by separation of frequent letter combinations, or digraphs, and through avoidance of awkward letter locations.

BACKGROUND ART

List of References Cited in This Section (United States Patents)

| | | |
|---|---|---|
| 2,040,248 | May 12, 1936 | Dvorak |
| 3,847,263 | Nov. 12, 1974 | X |
| 5,166,669 | Nov. 27, 1992 | Romberg |
| 5,836,705 | Nov. 17, 1998 | Choate |
| 5,879,089 | Mar. 9, 1999 | Armel |
| 6,053,647 | Apr. 25, 2000 | Parkinson |

The preferred embodiments of the keyboard patents listed here are shown in FIGS. 2 through 7 of the Drawings, for ease of reference. An additional list of world-wide keyboard patents is also included below. The members of that list have some common attributes, which allow them to be addressed as a group.

Standard Qwerty Keyboard

The current Standard keyboard is also known as the Qwerty keyboard, based on the first six letters on the left hand side of the upper row of alphabetic characters. It was designed for mechanical typewriters around 1872 by C. Latham Sholes. Letters were arranged to prevent the jamming of mechanical keys, a design which also slows down typing. The Qwerty keyboard is poorly optimized for speed on an electronic keyboard, where mechanical key interference is no longer an issue. Regardless, the Qwerty keyboard is familiar to most keyboard users and is well entrenched in industry. Many improved keyboards have been proposed as alternates to the Standard, but these alternatives have not been broadly commercially accepted over the past one hundred and thirty years.

Dvorak Keyboard

In U.S. Pat. No. 2,040,248, of May 12, 1936, August Dvorak and William Dealey revealed an improved keyboard, with respect to the speed of typing and the reduction of finger reach and strain. They recorded the frequency of two letter sequences in the English language, called digraphs. Using this data, awkward key patterns were avoided, such as striking different keys with the same finger. The most frequently used letters were placed on the middle or "home" row, to minimize finger reach and potential strain. Due to the speed improvements and reduced strain which it offers typists, the Dvorak keyboard is widely acknowledged in industry as a keyboard design that is superior to the Qwerty keyboard.

One drawback of the Dvorak keyboard is the random placement of alphabetic characters, virtually all of which are in different locations from the Standard Qwerty keyboard. This makes transition from the Qwerty keyboard quite difficult. Another problem exists, in that two frequent letters, A and S, appear at small finger locations on the home row. Dvorak mentions that use of small fingers in typing is awkward, but places A and S at such locations regardless, so that all high frequency letters except R appear on the home row.

"X" Keyboard

In a Nov. 12, 1974 patent, U.S. Pat. No. 3,847,263, an alternate to the Dvorak keyboard was introduced by "X", with many of the same attributes. For example, "X" positions most frequently used keys on the middle or home row of the keyboard. Letter frequencies in foreign languages other than English are also considered. The "X" keyboard has both dextral and sinistral versions, aimed at use by persons with dominant right and left hands, respectively. All vowels appear on the left hand side of the "X" keyboard, in its dextral version. Most vowels and consonants are interleaved in language, so this places many sequential key combinations on opposite hands. High frequency keys appear at both small finger locations in the "X" Keyboard. With many high frequency keys on the middle row, the "X" keyboard offers greater speed potential to a typist, relative to the Qwerty keyboard.

The two main drawbacks of the "X" keyboard are similar to those of the Dvorak keyboard. The "X" keyboard has a random arrangement of alphabetic letters, almost all of which differ from the Standard Qwerty locations. A new random arrangement of letters is seen as a significant barrier to the wide-spread use of any keyboard. As well, the "X" keyboard places two frequently used letters at small finger locations, namely O and S. This is seen as problematic, because small fingers are often less agile than other fingers.

Romberg/ASER Keyboard

U.S. Pat. No. 5,166,669 was granted Nov. 27, 1992, to Harvey D. Romberg. It outlines a keyboard layout aimed at reducing the difficulty in transition from the Standard Qwerty keyboard. A maximum of fifteen keys are moved from their Qwerty locations. Several high frequency letters move from their Qwerty locations to the home row, as occurs in Dvorak and "X" keyboards. The left hand side of the home row begins with the letter sequence A, S, E, R, leading to the name ASER Keyboard. The arrangement reduces finger reach from the home row to upper and lower rows. Reach reduction is aimed at both improving speed and reducing repetitive strain injuries.

Limitations are seen in the ASER keyboard. Six high frequency letters are moved to the home row, namely the letters: E, R, N, T, I and O. Because these letters are so common, it is remains difficult for a touch typist or a hunt style typist to adjust to the change. The goal of easing transition from the Qwerty layout is only partially achieved. Next, the ASER keyboard patent description does not explore digraphs or key sequences. Analysis shows that it is not well optimized in terms of placing digraphs on opposite hands. As well, the small finger is used for two high frequency letters on the home row, namely A and O. The last two factors indicate some limitation with respect to typing speed.

Choate/Red Hot Keyboard

Preceded by similar patents in 1994 and 1996, U.S. Pat. No. 5,836,705 was granted to John I. M. Choate on Nov. 17, 1998. Choate introduced a keyboard identified by the high frequency letters "As in Red Hot" on the middle or home row. Similar to the Romberg approach, there was a direct effort in the keyboard design to ease transition from the Standard Qwerty layout. No more than 16 letters move from their locations on the Qwerty layout, in "Red Hot" realizations of a keyboard. Six high frequency letters (E, I, O, T, N and R) are moved from Qwerty locations to new home row locations. The emphasis on home row letter location by Choate is aimed at reducing finger reach. Choate presents statistics showing that the Red Hot keyboard design significantly reduces "finger distance" traveled. This attribute is aimed at a reduction in repetitive stress injuries and carpal tunnel syndrome.

Choate also examines briefly the digraph statistics developed by Dvorak and Dealey. Choate notes that many of the frequent digraph pairs are now located on the home row, again reflecting a design aimed at reducing "finger distance" traveled. Placement of digraphs on opposite hands is not discussed by Choate and the layout is not optimized in that regard.

The main limitations seen in the Red Hot keyboard layout are similar to those of the ASER layout, discussed above. That is, six high frequency keys move from their Qwerty locations, so that transition from the standard may not be as easy as intended. As well, two high frequency letters (A and R) appear at small finger locations, which are awkward locations for many typists. Last, neither ASER nor Red Hot keyboards are optimized with respect to placement of high frequency digraphs on opposite hands. For the latter two reasons, there are typing speed limitations on both the ASER and Red Hot keyboards, as well as some ongoing difficulty in transition from Qwerty.

Armel/Central Keyboard

Another novel keyboard design was introduced by Gerald J. Armel, in U.S. Pat. No. 5,879,089, dated Mar. 9, 1999. Armel places an emphasis on the central region of the keyboard, which may be reached by the strongest and most dexterous fingers, the middle finger and forefinger, also called the "inner fingers". As used here, the term "finger dexterity" includes both the physical and mental aspects of finger control and movement.

A preferred embodiment of the Armel/Central Keyboard shows the most frequently used letters of the English language, in the center of the upper, middle and lower rows of the keyboard as follows:

| upper row | S, T, R |
| middle row | N, E, A |
| lower row | I, O, U |

This Central keyboard arrangement designed by Armel was aimed at users who may have difficulty using fingers other than inner fingers, for a variety of reasons.

One issue that arises with the Armel keyboard, is the placement of letters in "random" locations, nearly all of which are different from Standard Qwerty locations. History shows that this is a major inhibitor to keyboard adoption in practice. In addition, the Central keyboard discussed here is not well optimized with respect to placement of digraphs of opposite hands. A central positioning of high frequency letters causes many key sequences to be performed by the same finger or by adjacent fingers. These factors suggest fundamental speed limitations in the Armel or Central keyboard layout.

Alphabetic Keyboards

There are a quite a number of keyboard patents which include key layouts in alphabetical order as one of their characteristics. So called "Alphabetic" keyboards have been defined as early as May 28, 1985, in U.S. Pat. No. 4,519,721, by Kathleen A. Gardener. A more recent Alphabetic keyboard is found in U.S. Pat. No. 6,053,647, dated Apr. 25, 2000, by John V. Parkinson. The Parkinson patent is chosen for reference because it discusses the optimization of two key sequences, or digraphs, and claims to be better than the Dvorak layout, in this respect. The Parkinson analysis is confined to digraphs on the same row. When the analysis is expanded to frequent key sequences on two rows, as outlined herein, both the current invention and the Dvorak keyboard are seen to be better optimized for digraphs on opposite hands than the Parkinson Alphabetic keyboard implementation of the year 2000.

Alphabetical order is aimed at ease of learning for new users or those who only use a keyboard infrequently. The logical arrangement of keys in alphabetical order makes letters easier to find and to remember, in comparison to a random layout. This is of benefit to entirely new users or possibly persons who must only use keyboards infrequently.

Alphabetic arrangements of keys represents a total departure from the Standard Qwerty arrangement of keys. Because there are many existing keyboard users, who are familiar with the Qwerty layout, there will be an on-going barrier to adoption of an Alphabetic key layout.

The interleaving of vowels and consonants in the order of the alphabet makes it difficult to optimize such layouts for speed. A predetermined letter ordering, whether along rows or columns, inhibits placement of digraphs on opposite hands, which is an important factor for speed. Parkinson has tried to optimize this factor and may be considered "best-in-class" among Alphabetic keyboards. Still, both the current invention and the Dvorak keyboard place more digraphs on opposite hands. As such, the current invention is expected to be faster for typing and easier for Qwerty transition than Alphabetic keyboards in general.

Other Keyboard Arrangements (US, International and PCT/WIPO Patents)

| WO 01/73744 A1 | Oct. 4, 2001 | Woods, Debra L. |
| WO 9906216 | Feb. 11, 1999 | Pittard, Arthur George |
| U.S. Pat. No. 4,927,279 | May 22, 1990 | Morgan, Ruth B. |
| FR 2611589 | Sep. 9, 1988 | Marsan, Claude |
| U.S. Pat. No. 4,332,493 | Jun. 1, 1982 | Einbinder, Harvey |
| EP 0066991 | Dec. 15, 1982 | Rushforth, Shelagh Jane |
| GB 2041295 | Sep. 10, 1980 | Marsan, C. |
| U.S. Pat. No. 3,929,216 | Dec. 30, 1975 | Einbinder, Harvey |
| U.S. Pat. No. 3,698,533 | Oct. 17, 1972 | Illig et al. |
| U.S. Pat. No. 3,698,532 | Oct. 17, 1972 | Dodds, Irvine |
| U.S. Pat. No. 1,506,426 | Aug. 26, 1924 | Hoke, R. E. |
| U.S. Pat. No. 1,512,001 | Oct. 14, 1924 | Cerny, J. |

All of the above keyboard layouts share one important characteristic: the letter arrangements are entirely different from the Standard Qwerty keyboard and the majority of letters have moved from their Qwerty locations. Clearly, the patents listed here do not have ease of transition from the Standard Qwerty keyboard as one of their primary objectives or attributes. As such, they fall into a very different category from the current invention, which includes that constraint as one its primary goals.

The second and concurrent goal of the current invention is to increase the speed of typing. As outlined above, the Dvorak and "X" keyboards have been designed with that goal in mind. Both Dvorak and "X" keyboards have layouts which include the vowels A, E, I, O, and U on the left hand side of the middle row of the keyboard. This is a characteristic shared by a number of the patents listed here, namely: Pittard 1999, Marsan 1988 and 1980, Einbinder 1975, Dodds 1972, and Cerny 1924. As a group, they may be called "vowel oriented" keyboards. By separating vowels from high frequency consonants, frequent key sequences appear on opposite hands. Such a separation is one of the main elements contributing to higher speeds of typing on a keyboard.

It is not viewed as necessary to analyze in detail the behavior of all vowel oriented keyboards, to demonstrate that the current invention is novel and different from the group. Rather, it is felt to be sufficient to examine the keyboard which is generally acknowledged as "best-in-class" with respect to typing speed, namely the Dvorak keyboard from 1936. As evidence of that stature, the Dvorak keyboard is included as a "Language-Property" option in most versions of the Microsoft Windows Operating System (OS), and can be readily installed on computers with a Window OS. A second keyboard, the "X" arrangement of 1972 is analyzed in detail in this document. Examination of further individual vowel oriented keyboards is viewed as likely to be redundant; their behavior or properties are expected to fall within the range of behaviors exhibited by the Dvorak and "X" keyboards.

Multiple Letter Keyboard—Marsan, 1988

The 1988 patent by Marsan may be worth a brief mention, since it contains an example of a keyboard with multiple keys assigned to the frequent letters E and A in the French language. The multiple letters in the Marsan case are aimed at providing easy access to the use of accents grave (è) and aigu (é) on the letter E and accent grave on the letter A. This is not an uncommon approach to speeding typing on European language keyboards, which may apply a variety of accents to letters, often vowels. In the Marsan example, the variants of the letters E and A appear close to one another on the same side of the keyboard. In the current invention, two E keys are placed on opposite sides of the keyboard, with the objective of increasing the frequency of key sequences that may be struck by fingers of opposite hands. The usage of multiple keys in the current invention is different from that of the Marsan, 1988, keyboard or other keyboards with separate keys representing accents on vowels or other letters.

Concluding Remarks on the Background of the Invention

As noted above, vowel oriented keyboards are considered as a group, and the best performing keyboards in that category, the Dvorak and "X" keyboards, are examined in detail in this document, as background to the current invention.

Attributes of the Romberg and Choate keyboards are examined in detail herein, because those two arrangements are specifically aimed at easing transition from the Qwerty keyboard; no other keyboards have been identified with that stated objective. The Armel or Central keyboard has been examined, because of its emphasis on inner fingers, which is somewhat similar to the avoidance of small fingers. It is problematic in terms of transition from Qwerty, as well as speed potential.

An Alphabetic keyboard example was examined, since there are several known variants of keyboards with letter arrangements in alphabetical order, either along rows or up and down columns. All are similar, however, in that they constrain consonants in a manner that does not lend itself to optimization of key sequences on opposite hands. The alphabetical order chosen dictates consonant positions in each case. This imposes inherent speed limitations.

A patent by Marsan of 1988, with multiple occurrences of the frequent letters A and E, is seen to be quite different in design and intent than the current invention.

It is hoped, therefore, that the examination of existing patents and known keyboard designs, as covered in this document, may be a comprehensive review of the subject for the purpose of differentiating the current invention.

DISCLOSURE OF THE INVENTION

Summary

The instant invention is called the "XPeRT Keyboard", where the term "XPeRT Keyboard" is an unregistered product trademark. The current Standard keyboard is identified as the Qwerty keyboard, based on the letters Q, W, E, R, T, Y, on the left hand side of the upper row of the alphabetic character area. This sequence is replaced by the letter groupings X, P, E, R, T or X, P, R, T in the instant invention, to distinguish it from Qwerty. At the same time, as many letters as possible are kept in their current Qwerty locations, to ease the transition to the new keyboard for experienced typists. In particular, as few high frequency letters are moved as possible, while achieving substantial speed improvements. As few as three high frequency letters move from their current locations, namely: A, N and E.

In the most highly optimized version of the "XPeRT Keyboard", only the high frequency letters A and N move from their Standard Qwerty locations. The letter A moves to the right hand side of the keyboard and the consonant N moves to the left hand side of the keyboard. A second key for the letter E is created and placed on the right hand side of the keyboard. At the same time, a key with the letter E remains at its current Qwerty location, so that the high frequency letters E, I, O, R, S and T remain accessible in their current Qwerty locations. The effort in relearning the keyboard layout is thereby minimized. E occurs almost twice as frequently in the English language as other high frequency letters, so this treatment of the letter E, splitting its use across both hands, is quite powerful.

In a slightly less optimized version of the "XPeRT Keyboard", there is only one key with the letter E, and it is moved to the right hand side of the keyboard. The letters R and T may be shifted to the right one key each, to fill the gap left by E, so that the acronym "XPRT" is created. The "XPeRT Keyboard" version which uses only one E still has many of the advantages of the version with two keys for the letter E, as discussed in detail later.

While moving as few frequent letters as possible, the new "XPeRT Keyboard" has been optimized for speed. This is achieved mainly by placing frequent key pairs or digraphs in locations that are to be struck by fingers on opposite hands. Using digraph frequency statistics, the probable number of key sequences to be stuck by fingers of opposite hands for a given keyboard layout are tabulated. This measure of opposite hand use is identified as a primary factor contributing to the speed of a keyboard. The "XPeRT Keyboard" is optimized for this digraph factor, and is thereby optimized for speed. Tabulations and further analysis on this subject are presented in the Detailed Description of the Invention.

Unlike Dvorak, "X", ASER and Red Hot keyboards, the majority of high frequency keys are not placed on the home row of the "XPeRT Keyboard". Placing frequent letters on the home row reduces finger reach and assists in reducing finger strain, but it is not the only way to increase typing speed. For many typists who do not use a keyboard eight hours a day, lowering finger strain is less important than typing speed.

To further improve typing, the "XPeRT Keyboard" places none of the high frequency letters A, E, I, O, N, R, S, and T in locations accessed by small fingers. Partly because it shares a tendon with the ring finger, the small finger is the least dexterous of all fingers. Its use remains awkward for many typists. In contrast to the "XPeRT Keyboard", the Dvorak, "X", ASER and Red Hot keyboards all have two high frequency letters in awkward small finger locations, due to an emphasis on the home row. The "XPeRT Keyboard" offers an improvement over home row oriented keyboards, through avoidance of positioning high frequency letters at locations to be accessed by awkward small fingers.

The "XPeRT Keyboard" is novel and unique because it is able to simultaneously resolve more conflicting constraints than existing keyboards. It is designed to be as fast as Dvorak or "X" keyboards, without having similar problems in transition from Qwerty. By moving only three high frequency keys, it is best optimized for ease of transition from Qwerty, while offering higher typing speed potential than alternatives. Creation of a second key dedicated to the letter E further enhances these attributes of the "XPeRT Keyboard".

DETAILED DESCRIPTION OF THE INVENTION

The design objectives for the "XPeRT Keyboard" are listed here and are expanded upon below, by subject area:

Ease of transition from the Standard Qwerty keyboard; minimizing of the number of characters which change key locations.

Making frequently used keys accessible by more dexterous inner fingers and placing frequently used keys on the home row or retaining them in upper row positions.

Maximizing the potential for speed, by placing high frequency digraphs on opposite sides of the keyboard and avoiding small finger use.

Creation of a second key for the letter E.

Evaluation of the "feel" of the keyboard, based on user feedback.

Replacing the familiar Qwerty pattern on the left side of the top row of the keyboard by a readily recognizable set, namely X, P, R, T or X, P, E, R, T.

Qwerty Transition

This design consideration is almost self explanatory, although it has not been universally embraced by all keyboard designs. The resistance to change from the Standard Qwerty keyboard is best illustrated by the fact that the Qwerty layout remains dominant, after 130 years. It persists despite the fact that it is poorly optimized for typing on electronic keyboards, where the problem of mechanical key jamming due to rapid key striking has been eliminated.

In practical typing applications, the only hope for transition from Qwerty is seen in a keyboard which retains most of the letter placements in Qwerty. The "XPeRT Keyboard" moves only two to three high frequency keys to another row. All other moves are limited to medium and low frequency keys. It is believed that these minimal impact letter relocations will encourage users to experiment with the "XPeRT Keyboard" and will allow them to reach former levels of competency in typing in a minimum amount of time. Thereafter, the larger benefits to typing, as offered by the "XPeRT Keyboard" layout, will accrue.

Qwerty Letter Locations, by Key Number

FIG. 1 shows the alphabetic character or letter layout of the Standard computer keyboard in use today in Canada and the U.S. Western European keyboards are similar, with few letters moved. The letters on the left hand side of the upper row are Q, W, E, R, T, Y, which are often used to identify the Standard as the Qwerty keyboard. All letters of the alphabet have been numbered as elements from [1] to [26] in FIG. 1, where the sequential numbers identify the locations of the letters, and the key positions, of the Standard Qwerty keyboard, as follows:

Key numbers 1 to 10 correspond to letters Q through P, from left to right Key numbers 11 to 19 correspond to letters A through L, from left to right, and Key numbers 20 through 26 correspond to letters Z through M, from left to right In this manner, key positions are identified by unique numbers, or key numbers, relative to the alphabetic characters on the Qwerty layout. Key numbers defined here will be used from time to time to identify the placement of letters in this section and in the Preferred Embodiment of the Invention. Key numbers of the Qwerty letter layout are explicitly:

Q—[1], W—[2], E—[3], R—[4], T—[5], Y—[6], U—[7], I—[8], O—[9], P—[10],

A—[11], S—[12], D—[13], F—[14], G—[15], H—[16], J—[17], K—[18], L—[19],

Z—[20], X—[21], C[22], V—[23], B—[24], N—[25], M—[26].

The punctuation mark semi-colon in FIG. 1 is associated with key number [27].

Frequently Used Keys to be Accessible by Inner Fingers and on the Middle or Upper Rows of the Keyboard The frequency of occurrence of letters in English language, in popular novels and newspapers, has been derived by the author in percentage terms. Findings for Single Letter Frequencies are as shown in Table I, below.

The statistics in Table I are similar to letter frequencies quoted in other studies. More commonly accepted frequencies are: H—3.5% and N—7.8% and E—13.0, so that N is regarded as one of the set of eight high frequency letters, while H is treated as a moderate frequency letter. Other letter frequencies vary slightly also, but are not viewed as material to overall analysis. In the course of typing in the English language, the letter E is struck almost twice as frequently as any other letter, including the higher frequency letters.

TABLE I

Single Letter Frequency in English

| letter | frequency |
| --- | --- |
| a | 7.5% |
| b | 1.1% |
| c | 3.0% |
| d | 3.4% |
| e | 12.2% |
| f | 3.1% |
| g | 2.3% |
| h | 6.0% |
| i | 7.6% |
| j | 0.1% |
| k | 0.7% |
| l | 3.3% |
| m | 2.6% |
| n | 6.0% |
| o | 7.9% |
| p | 2.0% |
| q | 0.1% |
| r | 6.7% |
| s | 6.7% |
| t | 9.8% |
| u | 2.8% |
| v | 1.0% |
| w | 2.0% |
| x | 0.3% |
| y | 1.8% |
| z | 0.0% |

Groups of high frequency, medium frequency and low frequency letters are identified next. In summary:

The eight most frequent letters in English are: A, E, I, O, N, R, S, and T, representing roughly 66% of all keystrokes; of these, E represents roughly 12% to 13% of all keystrokes in English Eleven medium frequency letters in English are: D, F, G, H, L, M, P, U, W and Y, covering roughly 31% of keystrokes The seven lowest frequency letters in English are: J, K, B, Q, V, X, and Z, representing just over 3% of all keystrokes The objective is to place the most frequently used letters so that they are accessible by inner fingers or on the middle or upper rows, while minimizing change from Qwerty. With reference to letter locations on the Standard Qwerty keyboard, as shown in FIG. 1 of the Drawings, the "XPeRT Keyboard" layout incorporates the following movement of letters:

R, T, I, and O are retained on the upper row,
A, E and N are moved to inner finger locations on the home row; A and E move to the left hand side and N moves to the right hand side of the keyboard, and
S remains stationary on the home row The letter A has moved away from an awkward small finger location, to a dexterous forefinger location on the right hand side of the middle row. Low frequency letters J an K are located in prime positions on the Qwerty keyboard and are good candidates for replacement by A. Having moved A, it was decided to move N from its lower row location, so that it need not be struck by the same finger as the letter A. S was moved at one time also, but movement of more than two or three high frequency keys proved problematic for users. The E key was moved for reasons outlined in the next topic.

Optimization of Speed via Digraph Frequency

The digraph frequencies listed in Table I of Dvorak's 1936 patent have been combined, as shown in Table II, titled Digraph Frequency Sums, below. The statistical values for letter pairs such as ER and RE have been added together; otherwise the data remains unchanged. The relative position of ER will be the same as the relative position of RE on any keyboard, so this tabulation of the data lends itself more readily to an accurate analysis. In Table II the key pair statistic is found at the intersection of rows and columns headed by various letters. The total value of all key pair data on Table II is 3320. The relative value for the key pair EH and HE is 117, which may be stated as EH(117). The percentage occurrence of the key pair in English is therefore 117÷3320×100%=3.5%. Other high frequency key pairs are ER(162) at 4.9%. and TH(149) at 4.5%.

In the 1936 patent document, Dvorak focused his analysis on avoidance of awkward key sequences, such as striking two different keys with one finger or jumping from the upper to the lower row, using the same hand. Oddly, he mentions that small finger locations are awkward for a typist, but places the high frequency keys A and S at those locations on the middle row, regardless. The subject of digraphs on opposite hands does arise in the Dvorak patent, but the manner in which his keyboard supports this factor is not explicitly presented.

Opposite hand digraph placement will be analyzed briefly here, to support its usage as a major factor in typing speed optimization. First, take the simple example of the letter combinations, TH and SO, as located on the Qwerty keyboard. These letter pairs appear on different rows and on opposite sides on the keyboard. A quick test reveals that it is easy to achieve a speed of roughly 100 words per minute (wpm), when toggling the nonsense word "SOSO", in lower case with no spaces. Alternately, toggling adjacent inner fingers is nearly as fast at times, but this action has a more limited scope. For example, on the standard Qwerty layout, toggling the key pair JI is fast, whereas UK is not. Both actions involve the inner fingers on the top and middle rows, but reach becomes a problem for the UK sequence Reach becomes a major issue for fingers of the same hand, whereas it is much less of an issue when fingers are on opposite hands. A test was conducted on the Qwerty layout for two phases, namely: "the island is" and "as great as cats". The first phrase has letters on all three rows and good placement of key sequences across opposite hands: TH, HE, EI, IS, SL, LA, AN, and ND. In fact, each sequential key is struck by an opposite hand. Conversely, the second phrase is located mainly on the left hand side of the keyboard, so that typing is almost exclusive to the left hand and use of adjacent fingers. The awkward sequence AS(49) is included. The two contrasting phrases have been chosen to illustrate the benefits of placing sequential key strokes on opposite hand, versus same hand arrangements.

For right handed typists, using a hunt style of typing rather than touch typing, there were dramatic differences in the speed with which the two phases could be typed. On the Qwerty keyboard, typing "as great as cats" repetitively took roughly 50% more time than typing "the island is", with an equal number of total letters struck in each case. Conversely, on the "XPeRT Keyboard" with one E key, typing "as great as cats" was comparable in speed to typing "the island is" (there was some minor variation in test results). Because A and E are on adjacent inner fingers and on the same row, their action is fairly rapid; such design factors have been considered in the "XPeRT Keyboard".

Optimal usage of the data in Table II is a significant challenge. Dvorak made this task somewhat easier by allowing all letters to move to new random locations, thereby increasing the degrees of freedom in the solution to the problem. The objective of the "XPeRT Keyboard" is quite different and significantly more difficult: To optimize letter placement using digraph data while simultaneously minimizing transition from the Qwerty layout. This has proven to be a major challenge. At the end of several months of analysis and experimentation, an elegant and powerful solution was discovered. While it may not be the perfect solution, it has many positive attributes.

The least disruption is caused to the Qwerty keyboard by moving A and E to the right hand side of the keyboard, while N moves to the left hand side. With these three elegant moves, the Qwerty keyboard is transformed from "digraph disabled" to "speed enabled". Some low frequency keys must be moved to accommodate the change, but this has a lesser impact. At this point, many of the goals of the "XPeRT Keyboard" have been achieved.

Creation of a Second Key for the Letter "E"

A further advantage is achieved by creating a second key dedicated to the letter E, so that the letter E appears in its original Qwerty location, as well as on the right hand side of the keyboard. First, this overcomes much of the relearning obstacle introduced by moving the most frequent letter in English. Second, it splits the usage of the letter E across two hands. It allows E to be struck say 5% of the time by the left hand and 8% of the time by the right hand. Although E is struck almost twice as often as other keys, by this means the fingers used for E become no more tired than other fingers. Last, and equally as important as keeping E in a familiar location, the second E enables more high frequency digraphs to appear on opposite hands. Moving E to the right hand side enables ER(162), ET(65), ES(57) and several other high frequency digraphs. Keeping E in its old location enables additional important digraphs, such as EH(117), EM(50) and EL(42), among others.

The degree to which digraphs are located on opposite hands may be quantified. In doing so, an opposite hand "digraph factor" is defined. The "XPeRT Keyboard" of FIG. 10 has been analyzed in this manner and detailed results appear in Table III. The data values in Table III have a total of 2643, or just under 80% of the total digraph frequency data values in Table II, namely 3320. Beyond this range, many more scattered digraph frequencies occur, which have low impact on typing speed. In Table III, it is seen that the "XPeRT Keyboard" with two E keys is highly optimized for digraph placement on opposite hands. Very few digraphs remain on the same hand. OU(98) and ND(72) are not too problematic, since they are on the same row. AH(66) is a slight problem and will be discussed later.

The other keyboards discussed here and shown in FIGS. 1 through 9 of the Drawings have also been examined in terms of the opposite hand digraph factor defined in Table III. Totals were derived for each keyboard and the results are listed in Table IV. Note that the "XPeRT Keyboard" with only one E key, shown in FIG. 8, is similar in layout to FIG. 10. The "XPeRT Express Keyboard" example, shown in FIG. 9, builds on the keyboard in FIG. 8 and has six more keys moved from their Qwerty locations.

The "XPeRT Keyboard" compares favorably against the Dvorak and "X" keyboards, in Table IV. All other novel keyboard arrangements listed do not show strength in the opposite hand digraph factor defined. Rather, other keyboards have opposite hand digraph factors which hover around the value for random distribution, namely 50%. This is not the only factor affecting typing speed, but it is an important one, as explained above. Therefore, the results in Table IV indicate a fundamental limitation with respect to speed, for all keyboards listed, with the exception of the Dvorak, "X", and "XPeRT Keyboard" versions.

As mentioned earlier, the Alphabetic keyboard patented by Parkinson in 2000, claimed to be better optimized for digraphs on opposite hands than the Dvorak keyboard. The analysis was focused on digraphs which appear on the same row only, however. In the Dvorak keyboard the letter R appears on the upper row, while most other high frequency letters are on the home row. By limiting analysis of the Dvorak layout to digraphs on the same row, high frequency digraphs involving R, such as: AR(46) and RO(65) and ER(162), the highest of all values, are not considered. These are not difficult combinations for a typist on the Dvorak keyboard, and the single row analysis is felt to be too narrow.

When digraph analysis is expanded to include digraphs above 20 in value from Table II and to include digraphs on opposite hands regardless of the row on which they appear, then the results shown in Table IV are obtained. It is noted that there are many digraphs with a frequency value of greater than 20, so this group has a noticeable impact on typing. Experiments and practical experience show that moving from an upper row to the home row, or between adjacent rows, only slightly reduces the benefit to speed of having digraphs struck by opposite hands. The broader analysis is meaningful and of practical value.

TABLE II

Digraph Frequency Sums

| | a | b | c | d | e | f | g | h | i | j | k | l | m | n | o | p | q | r | s | t | u | v | w | x | y | z |
|---|---|---|---|---|---|---|---|---|---|---|---|---|---|---|---|---|---|---|---|---|---|---|---|---|---|---|
| a | | | | | | | | | | | | | | | | | | | | | | | | | | |
| b | 12 | | | | | | | | | | | | | | | | | | | | | | | | | |
| c | 28 | | | | | | | | | | | | | | | | | | | | | | | | | |
| d | 30 | | | | | | | | | | | | | | | | | | | | | | | | | |
| e | 25 | 34 | 38 | 38 | | | | | | | | | | | | | | | | | | | | | | |
| f | 7 | | | | 11 | | | | | | | | | | | | | | | | | | | | | |
| g | 8 | | | | 16 | | | | | | | | | | | | | | | | | | | | | |
| h | 66 | | 20 | | 117 | | 9 | | | | | | | | | | | | | | | | | | | |
| i | 9 | 3 | 15 | 19 | 13 | 18 | 11 | 35 | | | | | | | | | | | | | | | | | | |
| j | | | | | | | | | | | | | | | | | | | | | | | | | | |
| k | 6 | | 4 | | 10 | | | | 7 | | | | | | | | | | | | | | | | | |
| l | 41 | 5 | 4 | 16 | 41 | 1 | 2 | | 34 | | | | | | | | | | | | | | | | | |
| m | 30 | 2 | | | 50 | | | | 15 | | | | | | | | | | | | | | | | | |
| n | 92 | | 9 | 72 | 66 | 1 | 33 | | 88 | | 10 | 2 | | | | | | | | | | | | | | |
| o | 0 | 11 | 22 | 16 | 1 | 62 | 14 | | 20 | | 12 | 3 | 18 | 33 | 44 | | | | | | | | | | | |
| p | 12 | | | | 14 | | | | 4 | | | 11 | 4 | | 13 | | | | | | | | | | | |
| q | | | | | | | | | | | | | | | 1 | | | | | | | | | | | |
| r | 46 | | 2 | 13 | 162 | 9 | 3 | 2 | 22 | | 2 | 2 | 4 | 5 | 65 | 8 | | | | | | | | | | |
| s | 49 | | 2 | 1 | 57 | | | 16 | 53 | | 2 | 2 | 1 | 4 | 29 | 1 | | 12 | | | | | | | | |
| t | 64 | | 6 | | 65 | 3 | | 149 | 72 | | | 3 | | 24 | 85 | 3 | | 12 | 32 | | | | | | | |
| u | 1 | 13 | 7 | 1 | 3 | 8 | 1 | 2 | 5 | | 14 | 7 | 12 | 98 | 8 | 3 | | 44 | 27 | 28 | | | | | | |
| v | 22 | | | 2 | 59 | | | 0 | 13 | | | | | | 7 | | | | 1 | | | | | | | |
| w | 17 | | | | 42 | | | 19 | 32 | | 1 | | 2 | 31 | | | | 5 | 1 | 2 | | | | | | |
| x | | | | | 4 | | | | | | | | | | | | | 1 | | 1 | | | | | | |
| y | 21 | 4 | | 1 | 10 | | | | | | 13 | 8 | 8 | 58 | 1 | | | 15 | 3 | 4 | | | | | | |
| z | | | | | | | | | | | | | | | | | | | | | | | | | | | total of all data values on the table: 3320

TABLE III

Digraphs on Opposite Hands for the "XPeRT Keyboard" with Two "E" Keys

| Pair | Digraph Frequency Sums | | Keystrokes on Hands | | | |
| --- | --- | --- | --- | --- | --- | --- |
| | Value | Percentage | Oppo | Same | Oppo | Same |
| er | 162 | 6% | 1 | | 162 | 0 |
| th | 149 | 6% | 1 | | 149 | 0 |
| he | 117 | 4% | 1 | | 117 | 0 |
| ou | 98 | 4% | | 1 | 0 | 98 |
| an | 92 | 3% | 1 | | 92 | 0 |
| in | 88 | 3% | 1 | | 88 | 0 |
| to | 85 | 3% | 1 | | 85 | 0 |
| on | 76 | 3% | 1 | | 76 | 0 |
| nd | 72 | 3% | | 1 | 0 | 72 |
| it | 72 | 3% | 1 | | 72 | 0 |
| en | 66 | 2% | 1 | | 66 | 0 |
| ah | 66 | 2% | | 1 | 0 | 66 |
| or | 65 | 2% | 1 | | 65 | 0 |
| te | 65 | 2% | 1 | | 65 | 0 |
| at | 64 | 2% | 1 | | 64 | 0 |
| re | 59 | 2% | 1 | | 59 | 0 |
| yo | 58 | 2% | 1 | | 58 | 0 |
| of | 58 | 2% | 1 | | 58 | 0 |
| es | 57 | 2% | 1 | | 57 | 0 |
| is | 53 | 2% | 1 | | 53 | 0 |
| me | 50 | 2% | 1 | | 50 | 0 |
| as | 49 | 2% | 1 | | 49 | 0 |
| ar | 46 | 2% | 1 | | 46 | 0 |
| ur | 44 | 2% | 1 | | 44 | 0 |
| we | 42 | 2% | 1 | | 42 | 0 |
| al | 41 | 2% | | 1 | 0 | 41 |
| le | 42 | 2% | 1 | | 42 | 0 |
| ce | 38 | 1% | 1 | | 38 | 0 |
| ed | 38 | 1% | 1 | | 38 | 0 |
| hi | 35 | 1% | | 1 | 0 | 35 |
| be | 34 | 1% | 1 | | 34 | 0 |
| om | 33 | 1% | | 1 | 0 | 33 |
| ng | 33 | 1% | 1 | | 33 | 0 |
| il | 34 | 1% | | 1 | 0 | 34 |
| wi | 32 | 1% | 1 | | 32 | 0 |
| st | 32 | 1% | | 1 | 0 | 32 |
| ow | 31 | 1% | 1 | | 31 | 0 |
| ad | 30 | 1% | 1 | | 30 | 0 |
| ut | 28 | 1% | 1 | | 28 | 0 |
| am | 30 | 1% | | 1 | 0 | 30 |
| ac | 28 | 1% | 1 | | 28 | 0 |
| os | 29 | 1% | 1 | | 29 | 0 |
| av | 22 | 1% | 1 | | 22 | 0 |
| ir | 22 | 1% | 1 | | 22 | 0 |
| us | 27 | 1% | 1 | | 27 | 0 |
| ea | 25 | 1% | 1 | | 25 | 0 |
| nt | 24 | 1% | | 1 | 0 | 24 |
| ay | 21 | 1% | 1 | | 21 | 0 |
| ch | 20 | 1% | 1 | | 20 | 0 |
| co | 22 | 1% | 1 | | 22 | 0 |
| ho | 20 | 1% | | 1 | 0 | 20 |
| wh | 19 | 1% | 1 | | 19 | 0 |
| | 2643 | | | | 2199 | 444 |
| | Digraph Factor | | | | 83% | |

TABLE IV

Opposite Hand Digraph Factors for Various Keyboards

| | Digraph Elements | | |
| --- | --- | --- | --- |
| Keyboard Type | Opposite Hand | Same Hand | Digraph Factor |
| "XPeRT Keyboard" with Two Es | 2199 | 444 | 83% |
| "XPeRT Express Keyboard" (with One E) | 2174 | 469 | 82% |
| Dvorak | 2124 | 519 | 80% |
| "X" | 2092 | 551 | 79% |
| "XPeRT Keyboard" with One E | 1924 | 719 | 73% |
| Alphabetic/Parkinson | 1437 | 1206 | 54% |
| Qwerty/Standard | 1330 | 1313 | 50% |
| ASER/Romberg | 1191 | 1452 | 45% |
| Red Hot/Choate | 1497 | 1146 | 57% |
| Central/Armel | 1287 | 1356 | 49% |

Therefore, the XPeRT Keyboard, as well as Dvorak and "X" keyboards, are better optimized for speed, in terms of digraph placements, than the Parkinson Alphabetic keyboard, which is viewed as "best-in-class" among Alphabetic keyboards, in this regard. Recall that Dvorak, "X" and Alphabetic keyboards all use the degree of freedom allowed by moving virtually all letters from known Qwerty locations. The "XPeRT Keyboard" is able to achieve similar or better speed optimization, while minimizing the change from Qwerty at the same time.

One of the Parkinson Alphabetic options mentions the possible use of a second key for the letters O or E, but does not enter into a digraph analysis on the subject. The claims section of the patent mentions double letters, but does not specify any letters in particular. This is quite different from the use of a second "E" in the "XPeRT Keyboard", where the second "E" key directly enhances both primary goals, namely: improving opposite hand digraphs and speed and minimizing the difficulty of transition from Qwerty for an experienced typist.

Tradeoffs in Single Finger Digraphs and Use of Small Fingers

The "XPeRT Keyboard" design recognizes that high frequency keys are better accessed by inner fingers. One of the original motivators for the "XPeRT Keyboard" was to move the frequently used letter "A" away from the left small finger location on the home row, which is viewed as extremely awkward. It is noted that the small finger shares a tendon with the ring finger, so that it does not operate entirely independently. While strength is not an issue on electronic keyboards, the resultant lack of dexterity in the small finger remains a problem. Unfortunately, many keyboards leave high frequency keys in the awkward small finger locations. Examples are:

| Dvorak: | A and S | "X": | O and S |
| --- | --- | --- | --- |
| Romberg: | A and O | Choate: | A and R |
| Parkinson: | A, E, and I | Qwerty: | A |

For physical reasons, and based on feedback from users, placement of high frequency letters at a small finger location is believed to be a serious design flaw. Users estimate a 30% to 50% speed reduction for a common key at a small finger location. It also "feels" awkward. Let's estimate the impact of placing A and S at small finger locations by Dvorak, with single key frequencies A—8% and S—7%. A 30% speed reduction on those two keys implies a net negative impact of 30%×15%=5%, in overall typing speed on the keyboard.

Only four or five single finger digraphs, or letter pairs struck by the same finger, are found on the Dvorak keyboard.

Their frequency is low, as in: PU(8), GH(9), CT(6), NR(5). The random placement of keys allows some freedom. When a keyboard retains much of the Qwerty layout, it becomes difficult to avoid single finger digraphs entirely. The "XPeRT Keyboard" creates a noticeable single finger digraph by placing HA(66) together. This is done to improve opposite hand digraphs, such as AS(46), AR(49), AT(64), and several others. A high net benefit to speed is perceived in the movement of the letter A to the right hand side of the "XPeRT Keyboard" and away from an awkward small finger location.

There is a minor loss of speed due to single finger digraphs on the "XPeRT Keyboard". Conversely, there is a significant gain by avoiding small finger activity. The discussion here on avoidance of small finger use, and the analysis of single finger digraphs applies to the "XPeRT Keyboard" with one E key. Overall, therefore, the "XPeRT Keyboard" with one E key is seen as roughly equivalent to Dvorak and "X" keyboards for speed potential, particularly at moderate speeds, up to 60 words per minute, which apply to most typists.

The "XPeRT Keyboard" with two E keys has an opposite hand digraph factor which exceeds that of both Dvorak and "X" keyboards and suggests higher typing speed potential. Avoidance of the use of small fingers on the "XPeRT Keyboard" is seen is a further advantage in terms of comfort and speed.

Considering the "Feel" of a New Keyboard Layout

The feel of a new keyboard is considered to have two main components, namely the sense of ease derived directly from the layout and the ease with which someone familiar with typing on a Qwerty keyboard can make a transition to the new keyboard. It has been hypothesized that some of the more difficult transitions, for an experienced Qwerty keyboard user to make, will include the following:

1. Movement of more frequently used keys
2. Movement of frequently used keys to a location accessed by small fingers
3. Movement of keys from the left hand side to the right hand side or vice versa
4. Movement of keys to hidden locations on the lower row All of these concerns have been validated by experience in user trials, except number 4. Surprisingly, the "Y" location was found to be hard to reach. Conversely, the hidden old "N" location on the lower row was found to be easy to access. Both "E" and "G" were at one time placed in the "Y" location, but were found difficult to access there (there was a mental and physical resistance to the location). This is just one example of considering "feel" in the new layout. Changes involving V, Y, O, U, D and other letters were considered in the "XPeRT Keyboard" design process and dismissed, due to awkward feel. A great deal of fine tuning has taken place on the feel of the "XPeRT Keyboard", as will be necessary for user acceptance.

Replacing Qwerty with Something Visible

Last, it was deemed necessary to replace the Qwerty sequence on the left hand side of the top row with an alternate visible sequence. It was possible to create the acronym "XPeRT" on the left hand side of the top row. The acronym is applicable for keyboards with one or two Es, where it represents either of the sequences X, P, R, T or X, P, E , R, T. The "XPeRT" acronym involves a rotation of the letters X, Q, J, P, and W. These changes interfere with transition from a Qwerty keyboard, but were viewed as necessary, to readily differentiate the superior "XPeRT Keyboard", from the slow Standard, namely Qwerty. Further, X, Q, and J are low frequency letters and have little impact on relearning the layout. Keeping W on the left hand side produces a relatively good "feel".

A Summary of Keyboard Attributes

Considering all of the design objectives of the "XPeRT Keyboard", and the information presented above, its attributes are now summarized relative to that of other types of keyboards. Note that this discussion is directed specifically at the "XPeRT Keyboard" with one E key. The addition of a second E key adds further advantages.

The "XPeRT Keyboard" has been examined in terms of digraphs on opposite hands, avoidance of small fingers and single finger digraphs. It compares favourably with Dvorak and "X" keyboards in these areas. The latter keyboards are acknowledged as optimized for speed. The "XPeRT Keyboard" has the added constraint that as few letters as possible should move from their Qwerty locations. It has been surprising that the "XPeRT Keyboard" could be so well optimized for speed, with this added boundary condition.

ASER and Red Hot keyboards are of particular interest here, since both keyboard designs were aimed at easing transition for an experienced Qwerty keyboard user. Unfortunately, an emphasis on the middle or home row causes six high frequency letters to be moved from their existing Qwerty locations, on both of those keyboards. While that is a positive attribute, with respect to minimizing reach and finger strain, it is not the only way to achieve faster typing speeds. Both in theory and in practice, it is evident that transition from Qwerty is much easier when as few as three high frequency keys move from their Qwerty locations, as occurs in the "XPeRT Keyboard" designs.

The "XPeRT Keyboard" design achieves higher typing speeds not by placing all high frequency keys on the home row, but by maximizing digraphs on opposite hands. It is noted that ASER and Red Hot keyboards are not well optimized with regard to digraphs on opposite hands and both have two high frequency letters at small finger locations. For these reasons, speed limitations are seen in those keyboards. The "XPeRT Keyboard" is novel and unique, in that it offers significant speed improvements over ASER and Red Hot keyboards, while simultaneously making the transition from Qwerty much easier.

The "XPeRT Keyboard" offers a broader range of positive performance attributes than other keyboards discussed here, with the exception of reduction in finger strain. If someone suffers from finger strain or uses a keyboard for eight hours a day, that user may benefit more from a home row oriented keyboard than an "XPeRT Keyboard". For the majority of typists, however, many of whom are hunt style typists rather than touch typists, the "XPeRT Keyboard" offers dramatic speed improvements with little effort in transition from Qwerty.

BRIEF DESCRIPTION OF THE DRAWINGS

FIG. 1: Qwerty

This is a plan view of the Standard Qwerty keyboard, invented by C. L. Sholes and implemented on typewriters around 1872. The alphabetic characters or letters are numbered sequentially from 1 to 26 in their Qwerty locations, to identify key locations by number.

FIG. 2: Dvorak

This is a plan view of the Dvorak keyboard from a 1936 US Patent, aimed at increasing typing speed and reducing finger reach, with an emphasis on the home row. The majority of the letters in the alphabet (24 of 26) have moved from their Qwerty locations.

FIG. 3: "X"

This is a plan view of a dextral keyboard from a 1974 US Patent by "X", with many of the same attributes as the Dvorak keyboard. It also considers languages other than English and has left handed (sinistral) and right handed (dextral) versions.

FIG. 4: ASER

This is a plan view of an ASER keyboard from a 1992 US Patent by Romberg. The layout places frequently used letters on the home row and keeps 14 letters in Qwerty locations.

FIG. 5: Red Hot

This is a plan view of a Red Hot keyboard version from a 1998 US Patent by Choate; other versions have up to 12 letters on the home row and move numerals from the top row of the keyboard to a bottom row. The layout shown places frequently used letters on the home row to reduce reach and keeps at least 12 letters in Qwerty locations.

FIG. 6: Central

This is a plan view of a centrally oriented keyboard from a 1999 US Patent by Armel. In this layout most letters have been moved from their Qwerty locations. The most frequently used letters are in the center, accessible to inner fingers, as shown in an outlined area.

FIG. 7: Alphabetic

This is a plan view of an Alphabetic keyboard example from a 2000 U.S. patent by Parkinson. Letters are arranged in alphabetical order, with the first half of the alphabet on the left hand side of the keyboard. A small "x" is used for keys with optional characters.

FIG. 8: XPeRT One

This is a plan view of one version of the "XPeRT Keyboard", with one key for the letter E. The layout is optimized to increase typing speed, while minimizing change from Qwerty.

FIG. 9: XPeRT Express

This figure shows a plan view of a keyboard example modified from the layout shown in FIG. 8. It swaps three further letter pairs on six keys, to increase opposite hand digraphs, while retaining the underlying structure of the "XPeRT Keyboard" with one E key.

FIG. 10: XPeRT Two

This is a plan view of an enhanced version of the current invention, which is optimized to increase typing speed, while minimizing change from Qwerty. A second key is dedicated to the letter E. All letters which have moved from their Qwerty locations are shown in rectangles and the double letter E is highlighted by a rectangle and a circle.

BEST MODE OF CARRYING OUT THE INVENTION

"XPeRT Keyboard" with One "E" Key.

Based on all of the considerations discussed in the Detailed Description of the Invention above, the keyboard layout in FIG. 8, the "XPeRT Keyboard" With One "E" Key, was derived. Changes important to the preferred embodiment are outlined for each key that moves in location, relative to that of the Standard Qwerty layout, shown in FIG. 1 of the Drawings.

"A", a high frequency letter, moves away from the awkward small finger location on the left hand side at key number [11] and acquires a dexterous finger location, below the right forefinger on the home row at key number [17]. Frequent digraphs are separated on opposite hands, with frequency sums such as: AS(49), AR(46), and AT(64). Typing the phrase: "as great as cats" becomes efficient, rather than an exercise in frustration, due to "one-handed" typing. A similar improvement may be achieved by placing "A" at any location on the right hand side of the middle row, except the small finger location, that is, the old location of the punctuation marks, semi-colon/colon.

"E", at [3] is moved to the right hand side of the keyboard, taking an inner finger location on the home row, formerly occupied by the low frequency letter "K" at [18] in the Qwerty layout. "K" moves as noted in the next paragraph. The new "E" location improves frequent digraph sums, such as: ER(162), ET(65), EV(59) and ES(57), among others. A similar improvement may be achieved by placing "E" at the old location for the letter "J".

In a keyboard with only one key for the letter "E", movement of "E" creates a gap between the new location for "P" at [2] and the letters "R" and "T". This may be closed by shifting the letters "R", "T" and "Y" one position to the right, to key numbers [3],[4] and [5]. The new gap, at key number [6] is filled by a low frequency letter, namely "K". Keeping "R" and "T" on the left hand side of the keyboard places many high frequency digraphs on opposite sides of the keyboard. Some examples are: TH(149), OR(65), AR(46), RU(44).

"J" from [17] has been displaced by "A". As a low frequency letter, it moves to an awkward small finger location, namely the former location of "P" at [10] on the Qwerty layout.

The letters "N" and "G" exchange locations, relative to their Qwerty locations, at [15] and [25]. This puts "N " on the right hand side of the keyboard, and places more digraphs across opposite hands. Some of the digraphsums are: AN(92), IN(88), ON(76) and EN(66). Only NT(24) is sacrificed to the same hand, making this a good move. "N" may be swapped with alternate letters, such as "D" or "F", with only slightly different results.

Last, "Q" from [1] moves down to the old Qwerty "A" or [11] location and "X" from [21] replaces "Q" at [1]; "W" from [2] moves down to the old Qwerty "X" location [21]; "P" from [10] replaces "W". These moves are made to differentiate the Keyboard, replacing the upper row left hand side letters Qwerty, by the new acronym: "XPeRT".

This version of the instant invention may be called the "XPeRT Keyboard", since the letters X, P, R, T appear on the left side of the upper row of the keyboard. Only three high frequency keys are moved (A, E and N); their new dexterous inner finger locations are an asset for both usage and for relearning. They feel right. Three medium frequency keys (G, P and W) are moved and four low frequency keys (J, K, Q and X) are moved. The impact of moving the low frequency keys is felt to be minor.

Once a user is comfortable with the "XPeRT Keyboard" configuration as described here, it is possible to adapt it to further levels. Starting with the "XPeRT Keyboard" in FIG. 8, which may become familiar to a user, a second set of key changes can be applied to optimize speed further. For example, the placement of digraphs on opposite hands can be improved by:

Exchange of the letters "M" at [26] and "Z" at [20],
Exchange of the letters "B" at [24] and "L" at [19], and
Exchange of the letters "D" at [13] and "H" at [16].

This variant is called the "XPeRT Express Keyboard", with changes to letters M, Z, B, L, D, and H, as listed here, and shown in FIG. 9 of the Drawings. As shown in the example, further incremental improvements can be made in the placement of digraphs on opposite hands and different levels of performance may be achieved thereby. These build upon the "XPeRT Keyboard" base, with which a user may become familiar. Similar improvements should be obvious to someone skilled in the art after reviewing the approach to tradeoffs and new principles outlined herein. Such variants are viewed as falling within the scope of the embodiments of the instant invention.

"XPeRT Keyboard" with Two "E" Keys.

A more powerful version of the "XPeRT Keyboard" has also been introduced in the Detailed Description of the Invention. Its preferred embodiment is shown in FIG. 10, called the "XPeRT Two" keyboard, a layout with two "E" keys. Key movements are as described above for the case with one "E" key, including all key numbers referenced, with the following differences. "Old" key locations refer to the Standard Qwerty key locations.

The letter "E" remains in its old location on the Qwerty keyboard at key number [3]; consequently the letters R, T, and Y remain in their old locations and do not shift to the right. A second or new key dedicated to the letter "E" appears in the old "K" location at [18]; "K" shifts over to the old "comma" location (a punctuation mark) at key number [27]. The punctuation mark comma moves to the old location of an infrequently used symbol, like tilde (""). Tilde is removed from the keyboard and may be accessed through symbol tables.

In this manner, additional digraphs appear on opposite hands. As above, the most frequent digraph, ER(162), is struck by opposite hands. In addition, the frequent digraphs EH(117), EL(42) and EM(50) are preserved across opposite hands, in the "XPeRt Two" layout of FIG. 10, with an E key accessed by both hands.

As discussed, creation of two "E" keys has multiple advantages:

It eases transition for experienced Qwerty users

It splits the use of the most frequent letter over two fingers on two hands and reduces the effort expended by each finger striking the "E" key It increases digraph access by opposite hands, improving typing speed The benefits of creating a double "E" key may also be associated with any of the other high frequency letters, namely A, I, O, N, R, S, and T, to a lesser degree. As the next most frequent letter after "E" in English, "T" would be a good candidate as a letter with two dedicated keys. Similarly, for a keyboard to be used mainly in the German language, the most frequent letter in that language, the letter "A", would be a good candidate for a double key. The design principle introduced here applies to all frequent letters, where the benefits of a double key are roughly proportional to the frequency of that letter in a given language.

Implementation in Software or Hardware

The "XPeRT Keyboard" may be implemented on most computers or data entry devices via a simple software change in the system keyboard definition file, accompanied by a physical exchange of keycaps. The latter is easy to do on most keyboards; the keycaps just pop off and can be moved and reset. Alternately, software or hardware may be used to intercept keystroke information at a keyboard connection or driver interface. An intercept approach is more difficult, due to slight variations in interfaces for all components on the market. In any case, these are well-known software and hardware techniques. They are of interest here as a way to achieve a practical implementation of the "XPeRT Keyboard". In future, the "XPeRT Keyboard" may be implemented as off-the-shelf hardware, which will also require a new keyboard datafile, in order to remain compatible with existing keyboard hardware. The "XPeRT Keyboard" layout should also be complementary to many ergonomic keyboards, which have improved on the parallel row geometry of the Standard keyboard.

Combination of Positive Attributes

As outlined in the Detailed Description of the Invention, the "XPeRT Keyboard" offers a unique set of positive attributes, relative to existing keyboards. It is highly optimized for speed, as are "X" and Dvorak keyboards. At the same time, "XPeRT Keyboard" minimizes change from the Qwerty keyboard, while Dvorak changes the location of virtually all letters, making transition difficult for experienced typists. The "XPeRT Keyboard" layout does not focus on reduction of finger strain and does not move all high frequency letters to the home row. In this manner, difficulty in relearning the layout is minimized, while speed is maximized. It is important to note that the majority of these benefits accrue in the "XPeRT Keyboard" with one E key and that benefits simply increase with the addition of a second E.

For example, the author was able to increase typing speeds by 60%, after only a few days of use of an "XPeRT Keyboard" with one E key. A large document was written, but no special keyboard training exercises were undertaken. After introduction of a second E key, improvement in typing speed quickly jumped to 100%. Such dramatic improvements were obtained with little effort. As well, the combination AS is now a breeze.

Usefulness of the Invention

As stated initially, the Qwerty Keyboard was intentionally designed to slow down typing, to prevent jamming of keys on mechanical typewriters. Decades after the invention of the electronic typewriter and the computer, the mechanical typewriter is virtually extinct. One can only speculate at the total lost industrial productivity due exclusively to the Qwerty keyboard, since the 1930's when electronic typewriters were invented. The time is long overdue, to rescue typists from the past and from the constraints of 1872, which remain embodied in the Qwerty keyboard today, one hundred and thirty years later. It is hoped that the "XPeRT Keyboard" may provide a practical means to achieve this goal.

What is claimed is:

1. A keyboard for computers or electronic data entry devices or the like, having a plurality of alphabetic characters or letters assigned to keys in a region of three rows, wherein said region is comprised of a middle row, an upper row above the middle row and a lower row below the middle row, and said region has sequential key numbers from left to right, which correspond to letter assignments on a Standard Qwerty key layout as follows:

on the upper row, sequential key numbers 1 through 10 correspond directly to the letters Q through P, in order from left to right, and on the middle row, sequential key numbers 11 through 19 correspond to the letters A through L, in order from left to right, and on the lower row, sequential key numbers 20 through 26 correspond directly to the letters Z through M, in order from left to right, and wherein said region has a left hand side defined by the key numbers: 1 to 5, and 11 to 15, and 20 to 23, inclusive, and wherein said region has a right hand side defined by the key numbers: 7 to 10, and 16 to 19, and 25 and 26, inclusive, and said keyboard includes:

the vowels A and E, located on said right hand side of the middle row, and the consonants S and N, located on said left hand side of the middle row, and the consonants R and T, located on said left hand side of the upper row, and the vowels U, I, and O, located on said right hand side of the upper row.

2. A keyboard, as claimed in 1, wherein:

the letters R, T, S, I and O remain in their current Standard Qwerty keyboard locations at said key numbers 4, 5, 12, 8 and 9, respectively, or have not moved more than one adjacent key position within the row on which they are currently located.

3. A keyboard, as claimed in 1, including:

two separate keys representing at least one of the letters A, E, I, O, N, R, S or T, wherein one of these keys is located on said left hand side and the second of these keys is located on said right hand side of said keyboard.

4. A keyboard, as claimed in 1, including:

two separate keys for the letter E, wherein one of these keys is located on said left hand side and the second of these keys is located on said right hand side of said keyboard.

5. A keyboard, as claimed in 4, including:

the letters X, P, E, R, T, in that order from left to right, assigned to the leftmost key positions on the upper row, at said key numbers 1, 2, 3, 4, and 5, respectively.

6. A keyboard, as claimed in 4, wherein:

no letters within the set of letters A, E, I, O, N, R, S and T are placed at a key location which is accessed by a small finger, and those small finger locations correspond to said key numbers 1, 10, 11 and 20 and one key to the right of key number 19.

7. A keyboard, as claimed in 4, wherein:

no more than ten letters have moved key locations relative to current locations on a Standard Qwerty keyboard.

8. A keyboard, as claimed in 4, comprised of:

the vowels A and E assigned to key numbers 17 and 18, wherein these two vowels may appear in either the order A, E or the order E, A from left to right, and a second vowel E assigned to key number 3, and the consonant N assigned to key number 15, and the consonant G assigned to key number 25, and a plurality of keys representing the remaining letters of the alphabet.

9. A keyboard, as claimed in 4, comprised of:

the consonants R and T assigned to key numbers 4 and 5 respectively, and the vowels U, I, and O assigned to key numbers 7, 8, and 9 respectively, and a plurality of keys representing the remaining letters of the alphabet.

10. A keyboard, as claimed in 9, comprised of:

the vowels A and E located at key numbers 17 and 18, wherein these two vowels may appear in either the order A, E or the order E, A from left to right, and a second vowel E assigned to key number 3, and the consonant N located at key number 15, and the consonant G located at key number 25, and a plurality of keys representing the remaining letters of the alphabet.

11. A keyboard, as claimed in 10, wherein:

no letters within the set of letters A, E, I, O, N, R, S and T are assigned to a key which is accessed by a small finger, and those small finger locations correspond to said key numbers 1, 10, 11 and 20 and one key to the right of key number 19, and no more than ten letters have moved key locations relative to current locations on a Standard Qwerty keyboard, and the letters X, P, E, R, T, in that order from left to right, are assigned to the leftmost key positions on the upper row.

12. A keyboard, as claimed in 1, including:

two separate keys for the letter T, wherein one of these keys is located on said left hand side and the second of these keys is located on said right hand side of said keyboard.

13. A keyboard, as claimed in 1, including:

two separate keys for the letter A, wherein one of these keys is located on said left hand side and the second of these keys is located on said right hand side of said keyboard.

14. A keyboard, as claimed in 1, including:

the letters X, P, R, T located on the left hand side of the upper row, in that relative order, from left to right.

15. A keyboard, as claimed in 1, wherein:

no letters within the set of letters A, E, I, O, N, R, S and T are placed at a key location which is accessed by a small finger, and those small finger locations correspond to said key numbers 1, 10, 11 and 20 and one key to the right of key number 19.

16. A keyboard, as claimed in 1, wherein:

no more than ten letters have moved key locations relative to current locations on a Standard Qwerty keyboard.

17. A keyboard, as claimed in 1, comprised of:

the vowels A and E assigned to key numbers 17 and 18, wherein these two vowels may appear in either the order A, E or the order E, A from left to right, and the consonant N assigned to key number 15, and the consonant G assigned to key number 25, and a plurality of keys representing the remaining letters of the alphabet.

18. A keyboard, as claimed in 1, comprised of:

the consonants R and T assigned to key numbers 3 and 4 respectively, and the vowels U, I, and O assigned to key numbers 7, 8, and 9 respectively, and a plurality of keys representing the remaining letters of the alphabet.

19. A keyboard, as claimed in 18, comprised of:

the vowels A and E located at key numbers 17 and 18, wherein these two vowels may appear in either the order A, E or the order E, A from left to right, and the consonant N located at key number 15, and the consonant G located at key number 25, and a plurality of keys representing the remaining letters of the alphabet.

20. A keyboard, as claimed in 19, wherein:

no letters within the set of letters A,E,I,O,N,R,S and T are assigned to a key which is accessed by a small finger, and those small finger locations correspond to said key numbers 1, 10, 11 and 20 and one key to the right of key number 19, and no more than ten letters have moved key locations relative to current locations on a Standard Qwerty keyboard, and the letters X,P,R,T are located on the left hand side of the upper row, in that relative order, from left to right.

* * * * *